United States Patent [19]

Jinnai et al.

[11] 4,290,073
[45] Sep. 15, 1981

[54] INK-JET RECORDING APPARATUS

[75] Inventors: Koichiro Jinnai, Kawasaki; Kyuhachiro Iwasaki, Fujisawa, both of Japan

[73] Assignee: Ricoh Co., Ltd., Tokyo, Japan

[21] Appl. No.: 76,000

[22] Filed: Sep. 17, 1979

[30] Foreign Application Priority Data

Sep. 25, 1978 [JP] Japan .............................. 53/116493

[51] Int. Cl.³ ....................................... G01D 15/18
[52] U.S. Cl. ..................................................... 346/75
[58] Field of Search ....................................... 346/75

[56] References Cited

U.S. PATENT DOCUMENTS 3,739,395  6/1973  King ...................................... 346/75
3,813,676  5/1974  Wolfe ..................................... 346/75
3,864,692  2/1975  McDonnell ............................ 346/75

OTHER PUBLICATIONS

Lominac H. R.; Ink Drop Deflection Correction, IBM Tech Disc Bulletin, vol. 17, No. 9, Feb. 1975, pp. 2611–2612.

Primary Examiner—Joseph W. Hartary
Attorney, Agent, or Firm—Burgess, Ryan and Wayne

[57] ABSTRACT

An ink-jet recording apparatus wherein the ink jet is issued from an ink head or manifold and broken into drops. The selected ink drop is charged and made to pass through a first deflection means which deflects the charged ink drop in two mutually perpendicular directions, one being in parallel with a main scanning direction while the other being perpendicular to said direction. After leaving the first deflection means, the charged ink drop passes through a second deflection means which can cancel or nullify the deflection of the charged drop in said other direction, leaving the charged drop subject to the deflection in said main scanning direction so as to be steered to a predetermined point on a recording medium. The ink drops which are not used are not charged and travel a straight trajectory so as to be trapped by a gutter between the first and second deflection means.

3 Claims, 9 Drawing Figures

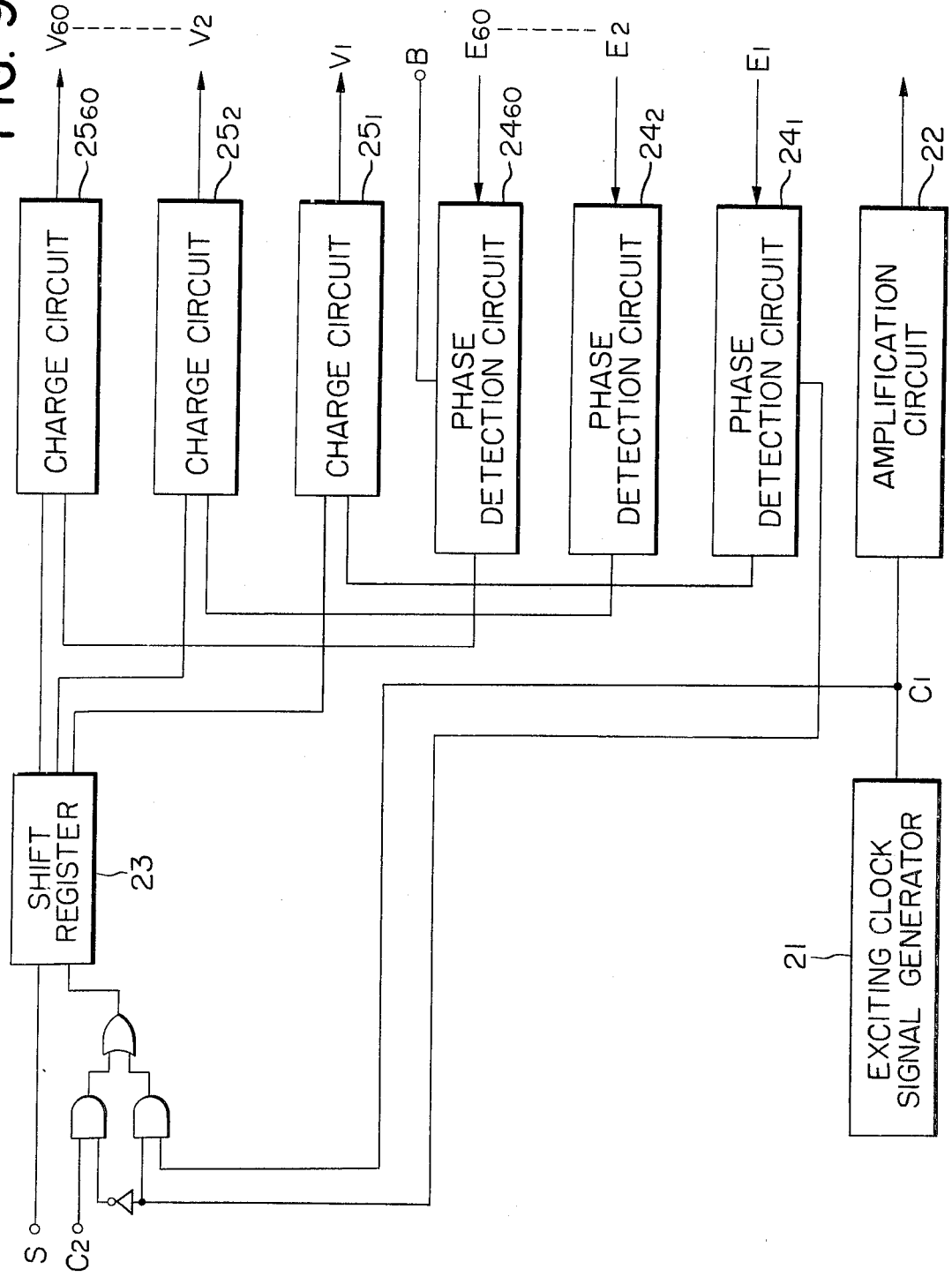

INK-JET RECORDING APPARATUS

BACKGROUND OF THE INVENTION

The present invention relates to an ink-jet recording apparatus and more particularly a multiple-ink-jet recording apparatus having an array of print head units so that ink dots in one line may be printed simultaneously.

There have been well known in the art various types of the multiple-ink-jet printers. In one type a continuous ink jet is issued from a nozzle of an ink head or manifold and breaks up into drops. The ink drop which is used or printed is charged at the instant when it is formed, and the charged drop is deflected by a pair of deflection electrodes by an amount proportional to its charge and strike a recording medium. The ink drops which are not used or printed are not charged so that they travel along a straight trajectory and are trapped for recirculation by a gutter disposed behind the deflection electrodes.

Gutters must be provided for respective print head units and must be located in the ink drop trajectories so as to trap the unused and uncharged ink drops traveling the straight trajectories. As a result, each print head unit cannot print an ink dot at a point on a recording medium just behind its gutter by its own ink drop. Therefore in order to print the spot just behind the gutter, the adjacent print head unit must deflect the charged ink drop at a large angle so that the deflected ink drop may be placed correctly at that spot. However, in practice it is very difficult to deflect the charged drop at a large angle with a high degree of accuracy so that the deflected ink drop may be correctly placed at the very spot behind the gutter without merging with the adjacent ink dots.

SUMMARY OF THE INVENTION

One of the objects of the present invention is therefore to provide a multiple-ink-jet recording apparatus in which each of print head units may print an ink dot at a point on a recording medium just behind of a gutter which may be located at any suitable position.

Another object of the present invention is to provide a single- or multiple-ink-jet recording apparatus in which each print head unit has a first deflection means for deflecting the charged ink drop in two mutually perpendicular directions, one being in parallel with a main scanning direction while the other being in the direction perpendicular to that direction, and a second deflection means for cancelling or nullifying the deflection in said other direction.

According to one aspect of the present invention, the first deflection means comprises two pairs of horizontal and first vertical deflection electrodes and the second deflection means comprises a pair of second vertical deflection electrodes which are impressed with a vertical deflection voltage equal in magnitude but opposite in direction to that applied to the first vertical deflection electrodes. A gutter is located between the first and second deflection means in the straight trajectory of the ink drop. When the charged ink drop passes through the first deflection means, it is deflected not only in the horizontal direction so that it may be placed at a predetermined point on a recording medium but also in the vertical direction to such an amount as to be able to jump over the gutter if the gutter is in the vertically undeflected trajectory. When the charged ink drop passes through the second deflection means, its vertical deflection is cancelled or nullified by the vertical deflection in the same amount but in the opposite direction so that the charged ink drop seems to have been deflected only in the horizontal direction without being deflected in the vertical directions. Thus the ink drops may be placed at any points on the recording medium which are in the shadow of the gutter.

BRIEF DESCRIPTION OF THE DRAWINGS

FIG. 9 is a block diagram of a control circuit of a multiple-ink-jet recording apparatus in accordance with the present invention.

Same reference numerals are used to designate similar parts in FIG. 2 through FIG. 8.

DESCRIPTION OF THE PREFERRED EMBODIMENTS

Figure 1:
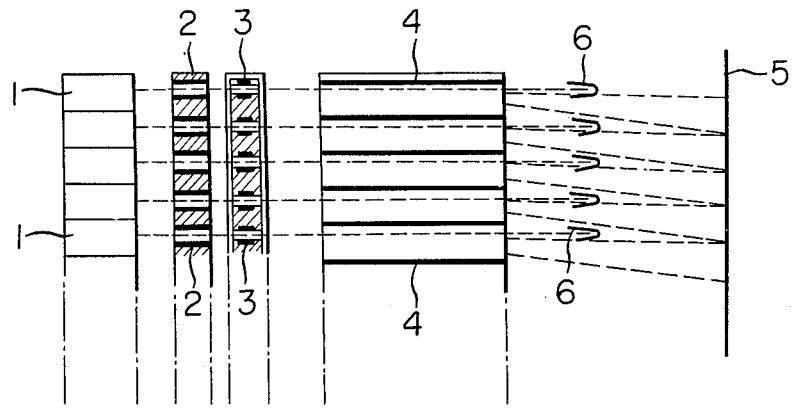
FIG. 1 is a schematic top view of a prior art multiple-ink-jet printer.

Prior Art, FIG. 1

Prior to the description of the preferred embodiments of the present invention, the print head of a prior art ink-jet printer will be described briefly in order to more specifically point out the problems thereof. In general, the print head comprises a plurality of print head units each comprising an ink head or manifold 1 from which the steam of ink drops is issued, a charge electrode 2 for charging the ink drops in response to the video signals, a detection electrode 3 for detecting the passage of the ink drops therethrough, a pair of deflection electrodes 4 for deflecting the charged ink drops in the horizontal direction and a gutter 6 for trapping the unused and uncharged ink drops for recirculation. When the charged ink drop passes through the deflection electrodes 4, to which is applied a DC voltage, it is deflected by an amount in proportion to a charge which is acquired to be steered to strike a recording paper 5 which is transported in the vertical direction, thereby leaving an ink dot at a predetermined position. The uncharged ink drops which are not used are not deflected by the deflection electrodes 4 so that they follow the straight trajectory and are trapped by the gutter 6 located between the deflection electrodes 4 and the recording paper 5.

However in the multiple-ink-jet print head, the gutters 6 must be provided in number equal to the nozzles or ink heads or manifolds 1. As a result, the ink drops cannot reach the places on the recording paper 5 just in the shadows of the gutters 6 so that when it is desired to draw a continuous line segment, each print head unit must place an ink drop at the spot on the recording paper 5 just in the shadow of the gutter 6 of the adjacent print head unit. As a consequence, the angle of deflection of the ink drop must not only be increased but also maintained with a higher degree of accuracy so that the merging of the adjacent ink drops may be avoided.

The Invention, First Embodiment, FIGS. 2-5

Figure 2:
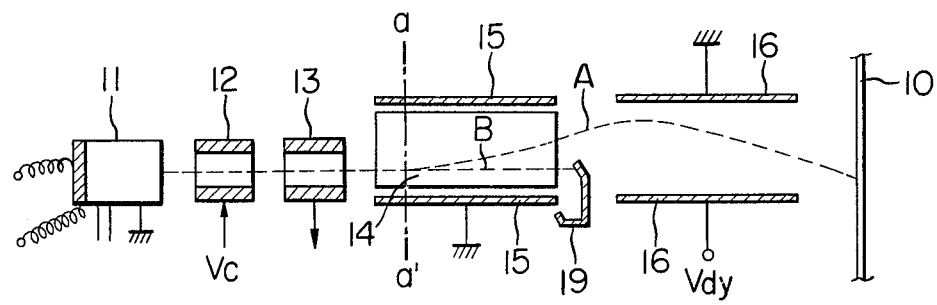
FIG. 2 is a longitudinal vertical sectional view of the print head of a first embodiment of the present invention.
Figure 3:
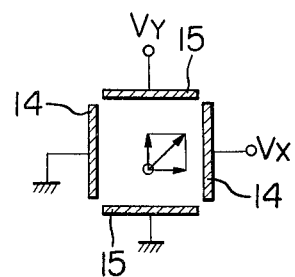
FIG. 3 is a sectional view taken along the line a—a' thereof.
Figure 4:
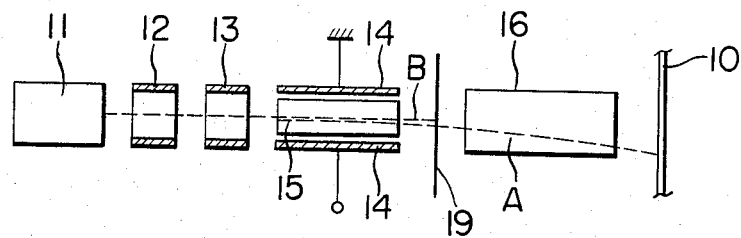
FIG. 4 is a longitudinal horizontal sectional view of the print head shown in FIG. 2.

Referring to FIGS. 2, 3 and 4, the print head of a first embodiment of the present invention has an ink head or manifold 11, a charge electrode 12 and a detection electrode 13, the functions of all of which are described above. The print head further includes a pair of horizontal deflection electrodes 14, a pair of first vertical deflection electrodes 15 and a pair of second vertical deflection electrodes 16. The horizontal deflection electrodes 14 and the first vertical deflection electrodes 15 constitute a first deflection means and are applied with the DC deflection voltages Vx and Vy, respectively. The second vertical deflection electrodes 16 which is a second deflection means is applied with the deflection voltage Vdy equal in magnitude to but opposite in direction to the vertical deflection voltage Vy applied to the first vertical deflection electrodes 15.

When the ink drop which is to be used; that is, the ink drop charged by the charge electrode 12 passes through the electrostatic fields established by the horizontal deflection electrodes 14 and the first vertical deflection electrodes 15, it is subjected to the horizontal and vertical components Fx and Fy as shown in FIG. 3 and consequently is deflected obliquely upwardly in the direction of the resultant force F. After leaving the first deflection means consisting of the electrodes 14 and 15, the ink drop passes the electrostatic field established by the second deflection means or the second vertical deflection electrodes 16. This electrostatic field is opposite in direction but equal in strength to that established by the first vertical deflection electrodes 15 so that the charged ink drop is deflected downwards as best shown in FIG. 2. This means that the upward deflection of the charged ink drop by the first vertical deflection electrodes 15 is cancelled by the downward deflection by the second vertical deflection electrodes 16. As a result the charged ink drop travels along the curved trajectory indicated by the broken lines A in FIGS. 2 and 4 and strikes the recording paper 10.

The ink drop which is not used is not charged so that it travels along the straight trajectory B shown in FIG. 2 or 4. Therefore, the gutter 19 may be positioned at such a height as to trap the uncharged ink drops traveling straight as best shown in FIG. 2. As a result, the accuracy imposed on the position of the gutter 19 may be considerably tolerated.

As with the conventional ink-jet process, the horizontal deflection is controlled by varying the voltage applied to the charge electrode 12, thereby varying the charge on the ink drop in response to the signal. As to the horizontal deflections, the binary or on-off control becomes possible.

Figure 5:
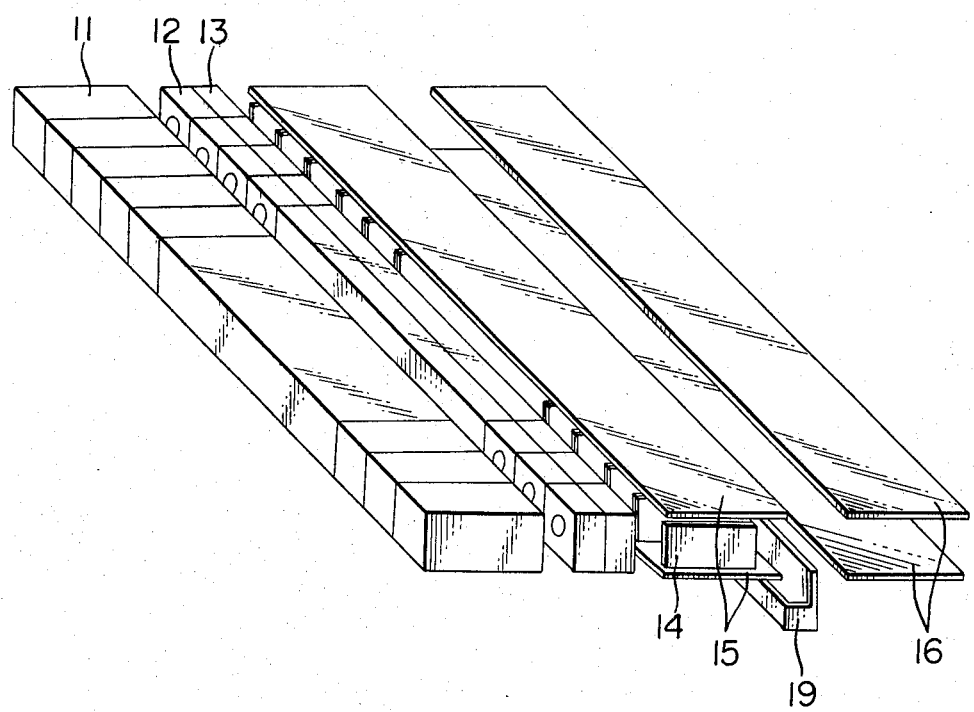
FIG. 5 is a perspective view of a multiple-ink-jet print head wherein a plurality of print heads shown in FIGS. 2 through 4 are assembled in an array as the print head units.

As shown in FIG. 5, a plurality of the print head of the type described may be assembled as the print head units into a horizontal array to provide a multiple-ink-jet print head capable of printing the whole horizontal line simultaneously. The first and second vertical deflection electrodes 15 and 16 and the gutter 19 may be shared in common by all the print head units.

Figure 6:
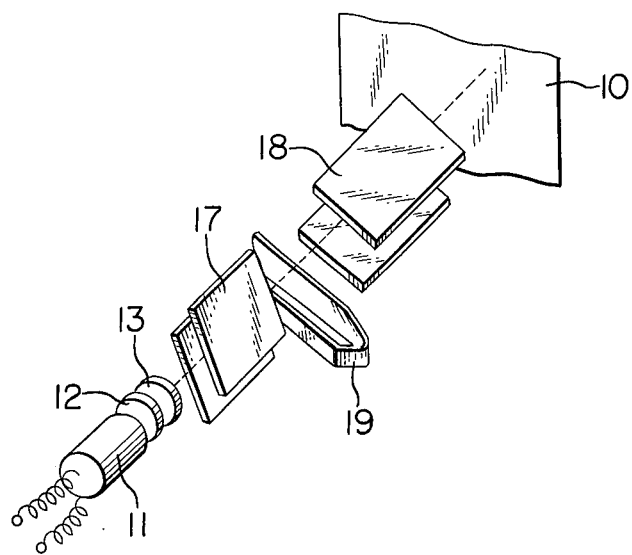
FIG. 6 is a perspective view of the print head of a second embodiment of the present invention.
Figure 7:
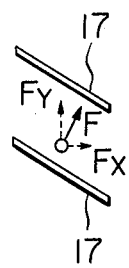
FIG. 7 is a sectional view of a pair of first deflection electrodes thereof.
Figure 8:
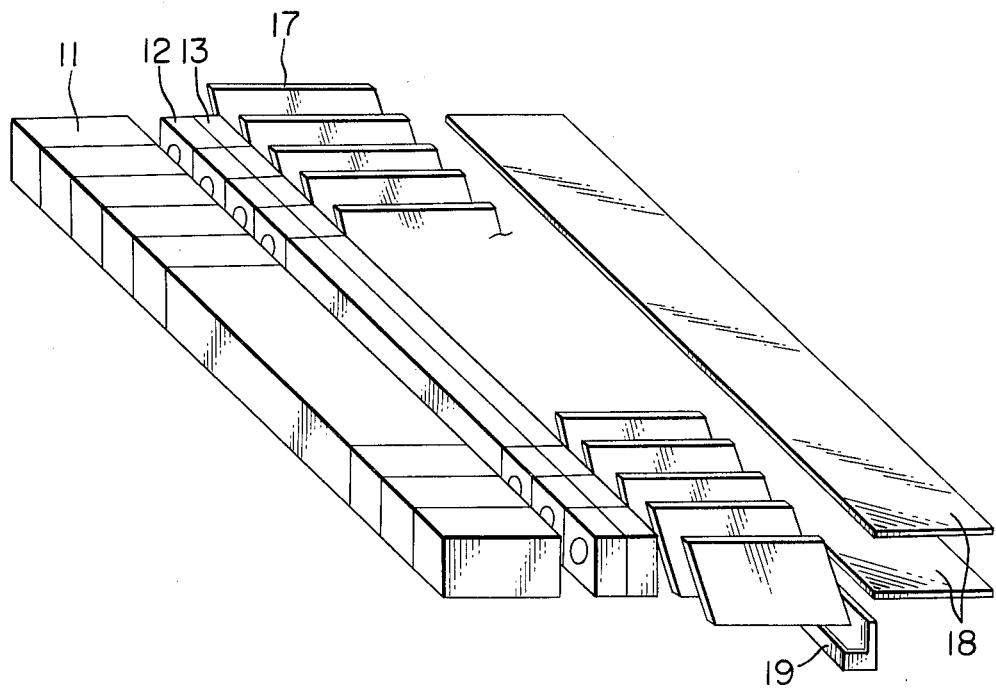
FIG. 8 is a perspective view of a multiple-ink-jet print head wherein a plurality of print heads shown in FIG. 6 are assembled into an array as the print head units.

Second Embodiment, FIGS. 6 through 8

In FIGS. 6 and 7 is shown a second embodiment of the present invention. While in the first embodiment the first deflection means comprises a pair of horizontal deflection electrodes and a pair of first vertical deflection electrodes, in the second embodiment the first deflection means comprises only one pair of deflection electrodes 17 inclined at an angle relative to the two directions or axes perpendicular to each other so that the force F to which the charged ink drop is subjected when passing through the electrostatic field established by the deflection electrodes 17 may be resolved into the horizontal and vertical components Fx and Fy, respectively, as shown in FIG. 7. Therefore the second vertical deflection electrodes 18 are impressed with such a deflection voltage that the vertical component Fy may be cancelled.

As with the first embodiment, a plurality of the print heads of the type shown in FIG. 6 may be assembled into a horizontal array to provide a multiple-ink-jet print head capable of printing the whole horizontal line simultaneously. The second vertical deflection electrodes 18 and the gutter 19 may be shared in common by all the print head units.

In FIG. 9 is shown a block diagram of a control circuit of the print head consisting of 60 units spaced apart from each other by 5 mm, the print head being capable of printing one horizontal line with the dot density of 8 dots/mm. Each print unit is capable of deflecting the charged ink drops at one of 40 discrete deflection angles.

An exciting clock signal generator 21 generates the exciting clock signal $C_1$ which is transmitted through a sinusoidal-wave shaping and amplification circuit 22 to the electromechanical transducers (not shown) mounted on the ink heads or manifolds 11. Video signals S are synchronized with the clock signals $C_2$ and stored in a shift register 23 consisting of 2400 stages (60×40) for each line. The output signals $E_1$ through $E_{60}$ from the detection electrodes 13 are applied to phase detection circuits $24_1$ through $24_{60}$ each of which is responsive to the detection signal B for detecting the phase at which the ink jet breaks off into ink drops and transmits to its corresponding charge circuit 25 the output signal representative of an optimum phase. After the phase detection, the shift register 23 is switched to the clock which is in synchronism with the exciting clock signal $C_1$ from the exciting clock signal generator 21 so that its contents are read out from the output terminals each provided for every 40 stages and are applied to the charge circuits $25_1$ through $25_{60}$. Each charge circuit 25 in turn applies the charge signal V to its corresponding charge electrode 12. The charge signal V has a voltage selected from 40 stepped voltages between 55 and 250 V and has a pulse waveform whose center coincides with an optimum phase.

According to the present invention, when the charged ink drop passes through the first deflection means it is deflected both in the horizontal and vertical directions, but when it passes through the second deflection means the vertical deflection is cancelled as described above. That is, the charged ink drops are deflected twice in the vertical directions in order to jump the gutter 19 and reach the spot just in the shadow of the gutter 19. Therefore after having passed through the second deflection means, the charged ink drop is deflected only in the horizontal direction at one of 40 discrete deflection angles. After one line consisting of 2400 dots has been printed, the recording paper or the multiple-ink-jet print head is moved vertically relative to each other. This printing procedure is repeated until all the test is printed.

In summary, according to the present invention it is not needed to provide a gutter for each print head unit and instead only one common gutter may be provided. The charged ink drops may jump the common gutter by two vertical deflections so that the charged ink drops may be deflected freely in the horizontal direction. In addition, the multiple ink jet print head can print all dots in one line simultaneously so that the ink-jet recording apparatus of the present invention may be used as the copies of facsimiles. Furthermore, the horizontal and vertical deflection voltages may be suitably selected independently of each other so that the horizontal deflection will not be adversely affected by the vertical deflections and consequently the horizontal deflection angles may be controlled with a higher degree of accuracy.

What is claimed is:

1. An ink-jet recording apparatus characterized by the provision of
    (a) an ink head or manifold from which the ink jet is issued,
    (b) a charge electrode for imparting a charge to the selected ink drop broken off from said ink jet in response to a video signal,
    (c) a first deflection means for deflecting the charged ink drop in a direction which may be resolved into two mutually perpendicular component directions, one being parallel with a main scanning direction while the other being in the direction perpendicular to said main scanning direction,
    (d) a second deflection means for cancelling the deflection in said direction perpendicular to said main scanning direction and
    (e) a gutter for trapping the unused ink drops interposed between said first deflection means and said second deflection means in front of a recording medium upon which the charged ink drops strike and disposed at a level upward or downward from the printing level in said main scanning direction.

2. An ink-jet recording apparatus as set forth in claim 1 further characterized in that
    said first deflection means comprises two pairs of mutually perpendicular deflection electrodes.

3. An ink-jet recording apparatus as set forth in claim 1 further characterized in that
    said first deflection means comprises a pair of deflection electrodes inclined at angles relative to said two mutually perpendicular directions.

* * * * *